UNITED STATES PATENT OFFICE.

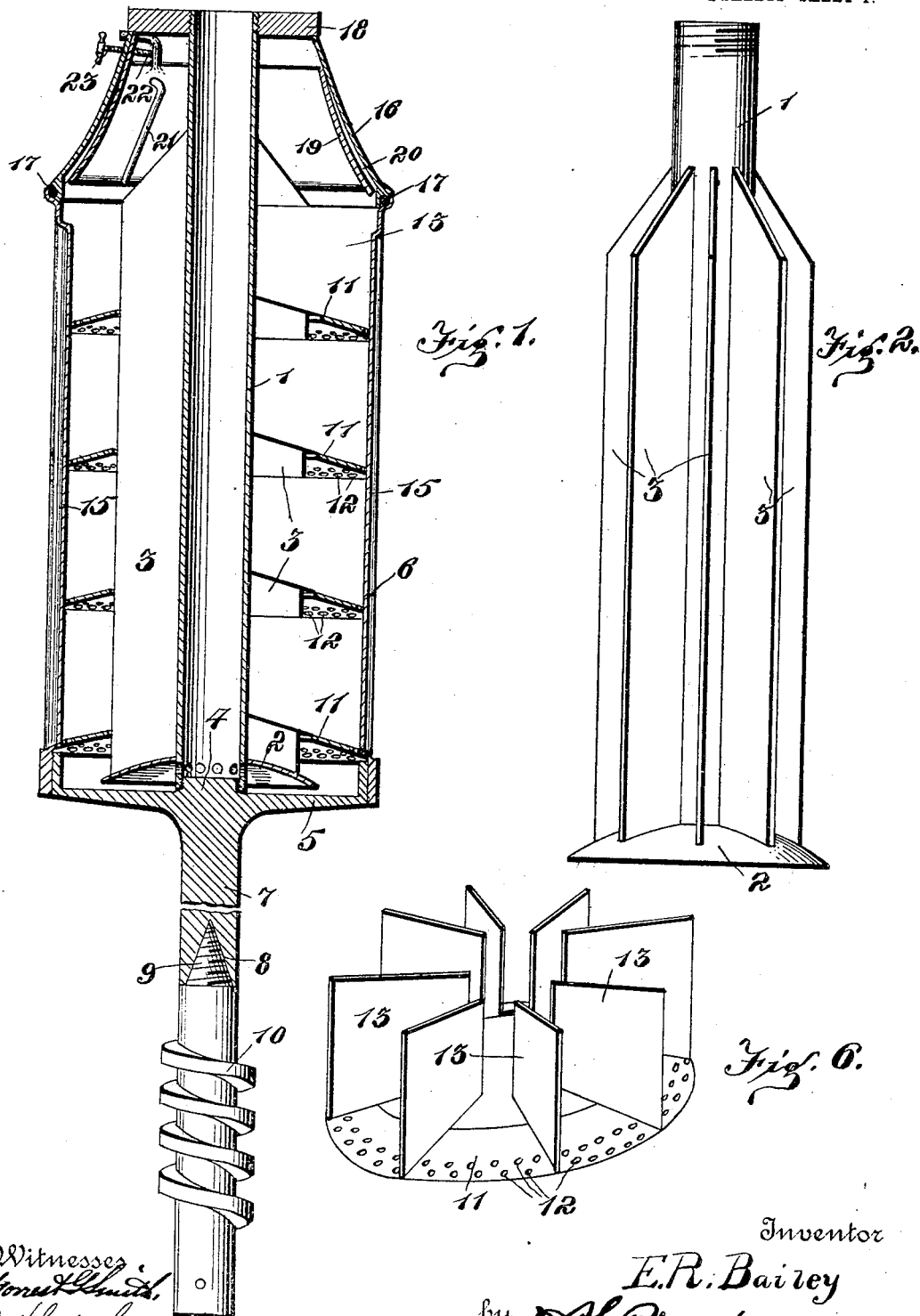

EDGERLY R. BAILEY, OF CLARINDA, IOWA.

CENTRIFUGAL CREAM-SEPARATOR.

No. 795,424.

Specification of Letters Patent.

Patented July 25, 1905.

Application filed April 3, 1905. Serial No. 253,463.

*To all whom it may concern:*

Be it known that I, EDGERLY R. BAILEY, a citizen of the United States, residing at Clarinda, in the county of Page and State of Iowa, have invented certain new and useful Improvements in Centrifugal Cream-Separators; and I do declare the following to be a full, clear, and exact description of the invention, such as will enable others skilled in the art to which it appertains to make and use the same.

This invention relates to centrifugal cream-separators, and one of the principal objects of the same is to provide a separator of the rotary-bowl type in which perforated disks and radial wings are utilized to separate the milk and cream and lead them to different discharge-openings near the top of the bowl.

Another object is to provide a separator of this type which shall be simple in construction, efficient in operation, and which can be readily taken apart for cleaning.

These and other objects are attained by means of the construction illustrated in the accompanying drawings, in which—

Figure 3:
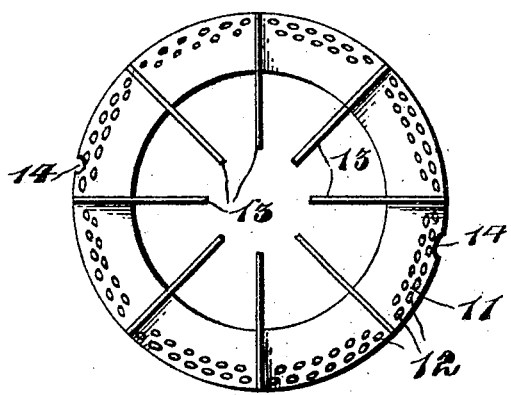
Figure 4:
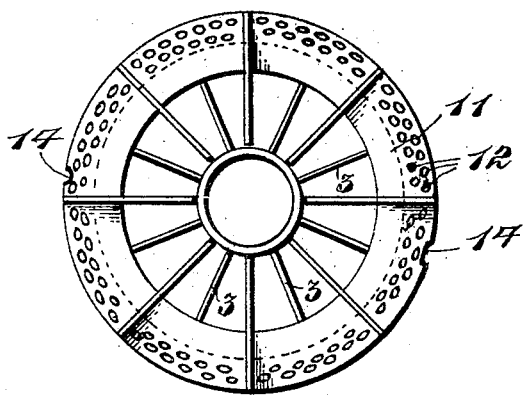
Figure 5:
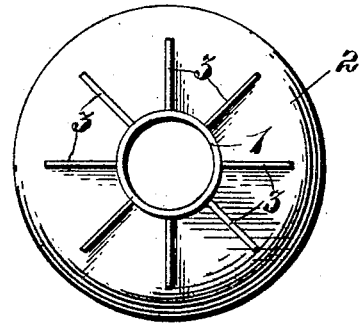

Figure 1 is a central vertical section of a separator made in accordance with my invention. Fig. 2 is a view in elevation of the feed-tube with the wings carried thereby. Fig. 3 is a plan view of one of the skimming-disks and the wings secured thereto. Fig. 4 is a plan view of one of the skimming-disks connected to the central feed-tube. Fig. 5 is a plan view of the feed-tube shown in Fig. 2, and Fig. 6 is a perspective view of one of the skimming-disks as shown in Fig. 3.

Referring to the accompanying drawings for a more particular description of my invention, the numeral 1 designates the centrally-disposed feed-tube having a cancavo-convex disk 2 at its lower end and provided with a series of radial vanes 3 extending from near the upper end of tube 1 to the top of the disk 2. The tube 1 is fitted at its lower end to a threaded boss 4, rising from the bottom 5 of the bowl or casing 6. Depending from the bottom 5 of the bowl is a spindle 7, having a conical recess 8 at its lower end to accommodate the conical point 9 of the worm or threaded spindle 10.

Fitted over the feed-tube 1 are a series of downwardly-flaring rings or disks 11, said rings having a series of perforations 12 near their peripheries. Secured to the rings 11 upon their upper faces are a series of radial skimming-wings 13, said wings extending from the periphery of the ring to a point substantially coincident with the outer surface of the feed-tube 1. The skimming-wings 13 are disposed intermediately of the vanes 3 on the tube 1, and to hold the wings in such relative positions the rings 11 are provided with peripheral recesses 14, which engage lugs or ribs 15 on the inner surface of the casing 6. As shown in the drawings, there are four rings 11 and four sets of radial wings 13. Any suitable number may be used, depending upon the vertical height of the bowl or casing.

At the upper end of the casing a cover 16 is fitted thereon and made liquid-tight by means of a rubber gasket 17 at its lower edge of the cover and a threaded cap-nut 18, which engages the threaded upper end of the feed-tube 1 and forces the cover 16 down firmly in place. A conical disk 19 is secured to the cover, and its lower edge is separated from the cover by a slight space 20, and at the opposite sides of the top of this disk discharge-openings 21 for the milk are provided. The discharge-opening 22 for the cream is provided with a screw-threaded valve 23, which may be adjusted to regulate the density of the cream to be discharged.

The operation of my invention may be described as follows: As the milk passes down through the tube 1 and reaches the bottom of the bowl the rotary motion imparted to the bowl moves the large fat-globules toward the center, and they are carried upward on the vanes 3. The thinner milk and smaller globules are carried outward and upward and are forced through the perforations of the bottom ring or disk. The milk is thus broken into a spray, and the small globules naturally seek the center. This action continues until the milk passes up through all the disks and wings until the top of the bowl is reached, where the separation is completed, and the skim-milk is forced through the outlets 21 and the cream is discharged through the opening 22.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a cream-separator, a hollow central shaft, vanes carried thereby, flaring perforated disks, wings on said disks, a containing-bowl, and means to revolve the same, substantially as described.

2. In a centrifugal cream-separator, a bowl and means for revolving the same, a hollow central shaft provided with radial vanes, a series of flaring perforated rings, wings carried thereby, a tapering cover, a deflector therein, said deflector provided with outlet-openings at the upper end thereof, a cream-discharge opening, and a screw-valve for regulating the size of said opening, substantially as described.

In testimony whereof I have hereunto set my hand in presence of two subscribing witnesses.

EDGERLY R. BAILEY.

Witnesses:
E. M. PUTNAM,
B. B. CLEVELAND.